United States Patent
Lecoeuche (10) Patent No.: US 10,996,138 B2
(45) Date of Patent: May 4, 2021

(54) PARALLEL OPTICS BASED OPTICAL TIME DOMAIN REFLECTOMETER ACQUISITION

(71) Applicant: VIAVI SOLUTIONS INC., San Jose, CA (US)

(72) Inventor: Vincent Lecoeuche, Tarentaise (FR)

(73) Assignee: VIAVI SOLUTIONS INC., San Jose, CA (US)

( * ) Notice: Subject to any disclaimer, the term of this patent is extended or adjusted under 35 U.S.C. 154(b) by 0 days.

(21) Appl. No.: 16/682,863

(22) Filed: Nov. 13, 2019

(65) Prior Publication Data

US 2021/0063273 A1 Mar. 4, 2021

(30) Foreign Application Priority Data

Aug. 30, 2019 (EP) .................................... 19306059

(51) Int. Cl.
*G01M 11/00* (2006.01)

(52) U.S. Cl.
CPC .... *G01M 11/3136* (2013.01); *G01M 11/3145* (2013.01)

(58) Field of Classification Search
CPC ..... H04B 10/071; G01M 11/30; G01M 11/31; G01M 11/3109; G01M 11/3118; G01M 11/3127; G01M 11/3136; G01M 11/3145; G01M 11/3154; G01M 11/3163; G01M 11/3181; G01M 11/319
USPC ....................................................... 356/73.1
See application file for complete search history.

(56) References Cited

U.S. PATENT DOCUMENTS

| | | | | |
|---|---|---|---|---|
| 4,990,770 A * | 2/1991 | Hemmann | ............. | G01M 11/31 250/227.24 |
| 5,090,802 A * | 2/1992 | Longhurst | .......... | G01M 11/3154 356/73.1 |
| 5,452,071 A * | 9/1995 | Takeuchi | ........... | G01M 11/3109 356/73.1 |
| 5,621,829 A * | 4/1997 | Ford | ...................... | G02B 6/359 385/115 |
| 5,664,034 A * | 9/1997 | Mock | ................... | G02B 6/3504 385/15 |
| 5,767,957 A * | 6/1998 | Barringer | ........... | G01M 11/3136 356/73.1 |
| 5,936,719 A | 8/1999 | Johnson | | |
| 5,995,687 A * | 11/1999 | White | ................ | G01M 11/3136 385/14 |
| 6,259,993 B1 * | 7/2001 | Hori | .................... | G01M 11/3136 356/73.1 |
| 6,980,287 B2 * | 12/2005 | Renard | .............. | G01M 11/3136 356/73.1 |
| 8,456,622 B1 * | 6/2013 | Estes | ........................ | G01J 9/02 356/73.1 |
| 9,429,496 B2 * | 8/2016 | Kuznia | ............. | G01M 11/3145 |
| 9,900,087 B2 * | 2/2018 | Ruchet | ..................... | G02B 6/14 |

(Continued)

*Primary Examiner* — Gordon J Stock, Jr.
(74) *Attorney, Agent, or Firm* — Mannava & Kang, P.C.

(57) ABSTRACT

In some examples, parallel optics based optical time domain reflectometer acquisition may include a laser array operatively collimated to an optical fiber array to transmit, in parallel, a plurality of laser beams to optical fibers of the optical fiber array. A photodiode array may receive, in parallel, backscattered and reflected light from the optical fiber array. The photodiode array may determine, based on the backscattered and reflected light, properties of the optical fibers of the optical fiber array.

17 Claims, 9 Drawing Sheets

(56) References Cited

U.S. PATENT DOCUMENTS

2015/0188626 A1 7/2015 Viswanathan
2017/0234767 A1 8/2017 Leclerc et al.

* cited by examiner

TRANSMIT, IN PARALLEL BY A LASER ARRAY OPERATIVELY COLLIMATED TO AN OPTICAL FIBER ARRAY, A PLURALITY OF LASER BEAMS TO OPTICAL FIBERS OF THE OPTICAL FIBER ARRAY
802

RECEIVE, IN PARALLEL BY A PHOTODIODE ARRAY, BACKSCATTERED AND REFLECTED LIGHT FROM THE OPTICAL FIBER ARRAY
804

DETERMINE, BY THE PHOTODIODE ARRAY AND BASED ON THE BACKSCATTERED AND REFLECTED LIGHT, PROPERTIES OF THE OPTICAL FIBERS OF THE OPTICAL FIBER ARRAY
806

*FIG. 8*

FIG. 9 ured. The measurements may be made sequentially, for example, by using an optical switch, to measure one optical fiber after another of a fiber optic cable.
PARALLEL OPTICS BASED OPTICAL TIME DOMAIN REFLECTOMETER ACQUISITION

PRIORITY

The present application claims priority under 35 U.S.C. 119(a)-(d) to European patent application number 19306059.7, having a filing date of Aug. 30, 2019, the disclosure of which is hereby incorporated by reference in its entirety.

BACKGROUND

A fiber optic cable may include one or more optical fibers. The optical fibers may transmit light from a source to a destination. The transmitted light may be backscattered and reflected. The backscattered and reflected light may be analyzed to determine properties of the optical fibers.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Parallel optics based optical time domain reflectometer acquisition systems, and methods for parallel optics based optical time domain reflectometer acquisition are disclosed herein. The systems and methods disclosed herein provide for implementation of synchronous OTDR acquisitions, for example, by implementation of a plurality of OTDR measurements in parallel.

As disclosed herein, fiber optic cables may integrate a plurality of optical fibers. As data rate specifications increase, such specifications may result in an increase in a number of optical fibers in a fiber optic cable to therefore increase the capacity of the fiber optic cable. In some cases, measurement times associated with such optical fibers may be impacted by the number of optical fibers in the fiber optic cable. For example, an increase in a number of optical fibers in a fiber optic cable may result in relatively large overall measurement times associated with the fiber optic cable. This is because, in some cases, each optical fiber in a fiber optic cable may be sequentially measured. If the measurement time per optical fiber is reduced to reduce the overall measurement time for the fiber optic cable, such a reduction may negatively impact quality of the measurement results.

Figure 2:
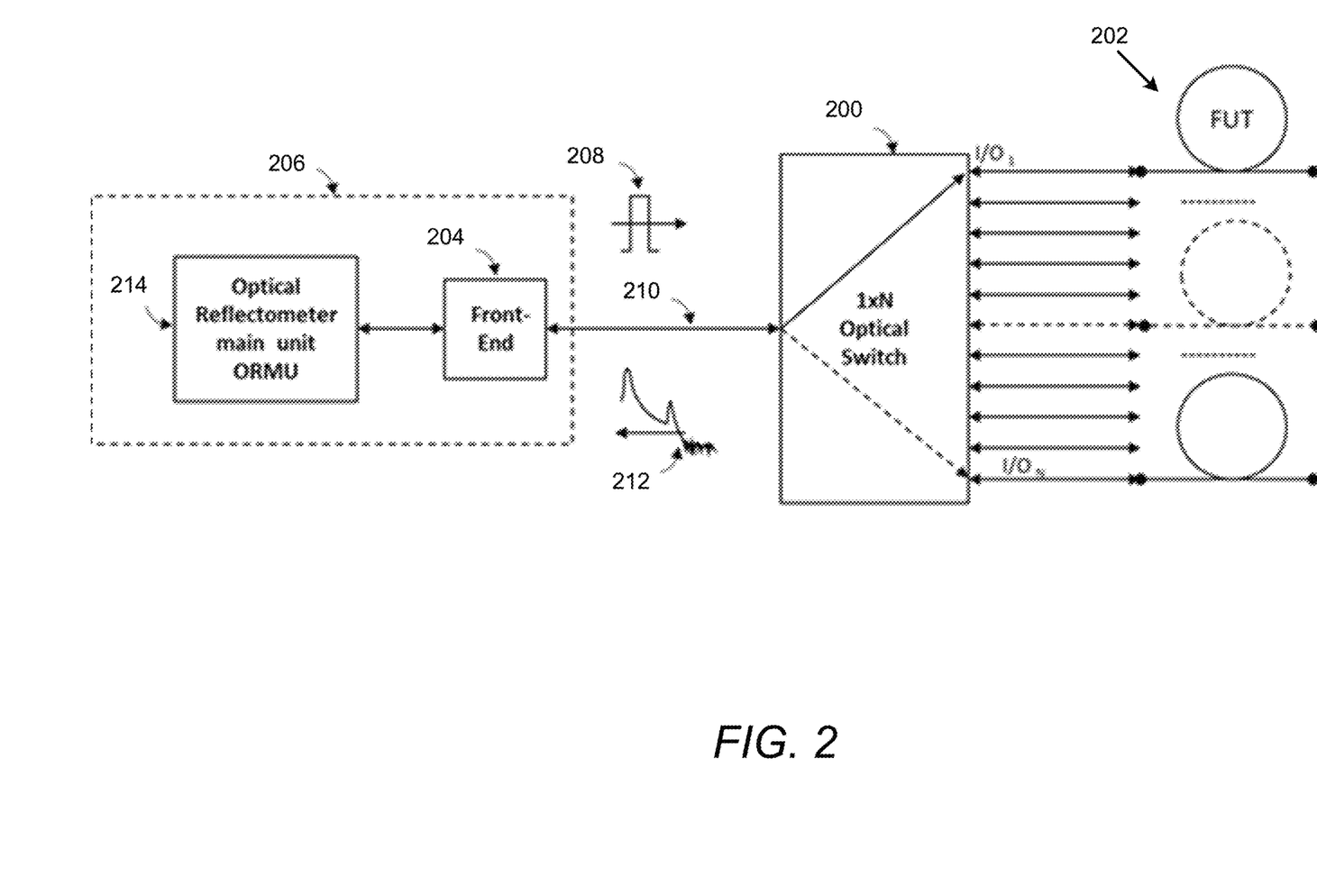
FIG. 2 illustrates an OTDR and optical switch arrangement for measurement of a plurality of optical fibers in accordance with an example of the present disclosure.

For example, FIG. 2 illustrates an OTDR and optical switch arrangement for measurement of a plurality of optical fibers in accordance with an example of the present disclosure.

With respect to FIG. 2, a time to measure an optical fiber of a fiber optic cable may depend on factors such as characteristics of the optical specifications, expected performance, and performance of the measuring device. For example, measuring dynamics of the measuring device may need to cover a link budget with a margin that is sufficient for the expected performance. In the case of reflectometric measurement, the measuring device may be connected to one end of an optical fiber that is to be measured. The measurements may be made sequentially, for example, by using an optical switch, to measure one optical fiber after another of a fiber optic cable.

For example, as shown in FIG. 2, with respect to automatic test configuration or fiber optic cable monitoring, an optical switch 200 may be utilized to time multiplex a measurement system. Thus, optical fibers 202 (e.g., fibers under test) may be tested sequentially. The optical switch 200 may be used to drive a single-port OTDR test signal to each test port onto which an optical fiber is connected. The optical switch 200 may be connected to a front end interface 204 of a fiber optic reflectometry system 206 (e.g., an OTDR). Further, the optical switch 200 may be connected to the optical fibers 202. An optical stimulus 208 from the front-end interface 204 may be injected at 210 into an optical fiber, and a return signal 212 (e.g., backscattering, reflection, etc.) may be converted into an electrical signal. The electrical signal may be analyzed in an optical reflectometer main unit (ORMU) 214.

The optical switch 200 may scan all of the optical fibers 202 with measurement parameters that may vary from fiber to fiber. A total measurement time may thus depend on each single fiber measurement time, and a number of fibers to be tested in a fiber optic cable. For example, an OTDR dynamic range may follow a 5 LOG 10($\sqrt{N}$) law or 2.5 LOG 10(N) law, where N is the averaging number (or averaging time), to thus result in a gain of 0.75 dB each time the acquisition time is doubled. For an example of a 16-fiber sequential test, for a given total measurement time, the 16 fiber sequential test may need an improvement of more than 3 dB of the measurement dynamics of the optical reflectometer main unit 214. Additionally, switching time for the optical switch 200 may also be added. Thus, it is technically challenging to reduce measurement time with respect to optical fibers, without negatively impacting quality of the measurement results. It is also technically challenging to reduce measurement time with respect to optical fibers without increasing the performance specifications (and thus cost) of a measurement unit.

In order to address at least the aforementioned technical challenges, the systems and methods disclosed herein may implement synchronous OTDR acquisitions. For example, the systems and methods disclosed herein may implement a plurality of OTDR measurements in parallel. In some examples, the systems and methods disclosed herein may implement parallel optics for synchronous OTDR acquisitions.

Figure 1:
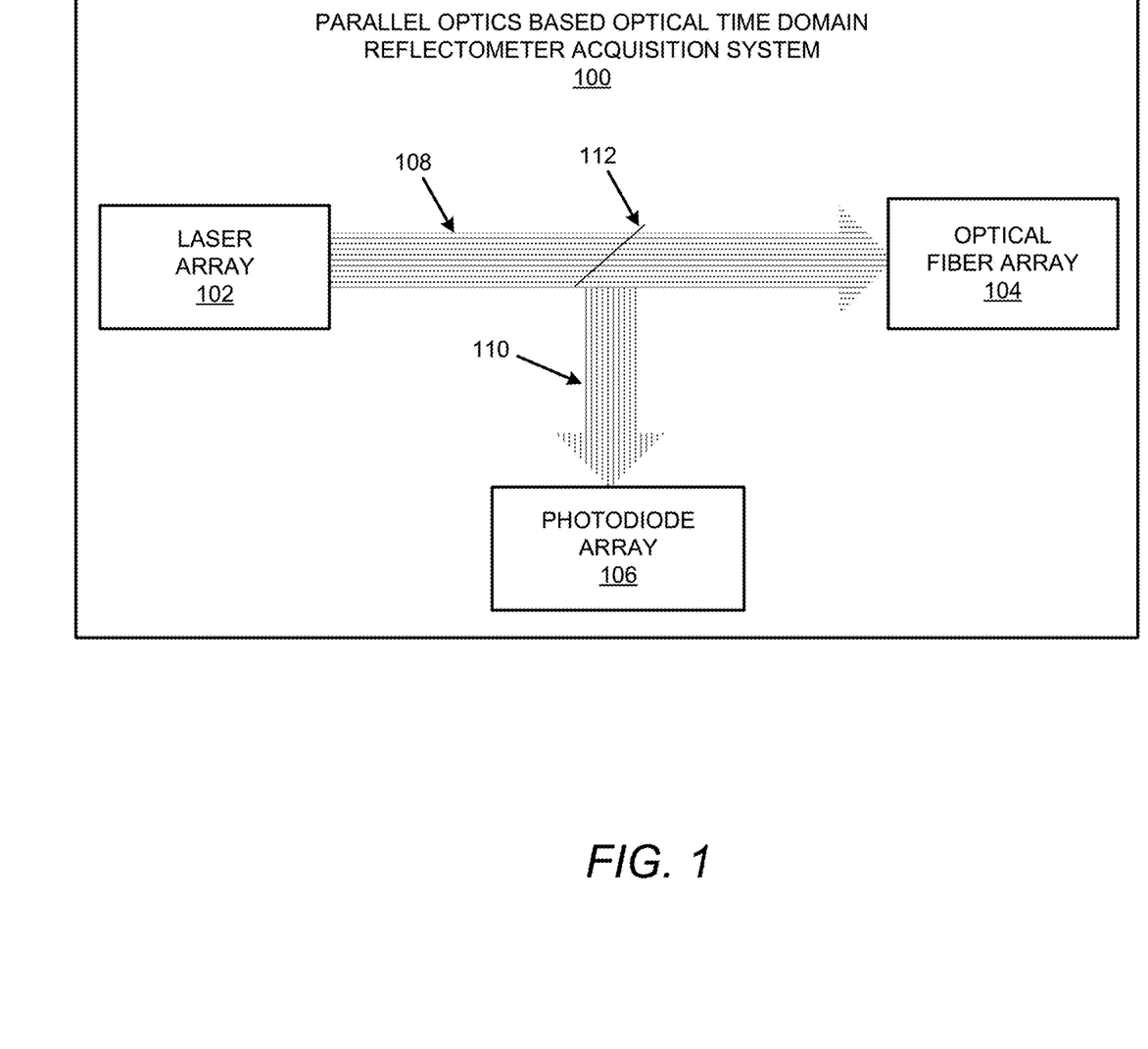
FIG. 1 illustrates an architectural layout of a parallel optics based optical time domain reflectometer (OTDR) acquisition system in accordance with an example of the present disclosure.

FIG. 1 illustrates an architectural layout of a parallel optics based optical time domain reflectometer acquisition system (hereinafter also referred to as "system 100") in accordance with an example of the present disclosure.

Referring to FIG. 1, the system 100 may include a laser array 102 operatively collimated to an optical fiber array 104 whose backscattering light may be operatively directed to a photodiode array 106. In this regard, depending on the choice of the array structure for the arrays of the system 100 (e.g., a line, a square, a circle, etc.), a laser beam may be configured to match in terms of geometry and dimensions at each device. For example, if all configurations associated with a laser beam match natively, lenses may be utilized at a focal distance. In other cases, combinations of lenses may be utilized to reshape and/or adapt dimensions of a laser beam (e.g., the rod lens and the cylindrical lens configuration of FIG. 6) to adapt the two dimensions of a laser line to a fiber line. Even a laser with a "Gaussian" transverse profile may be transformed into a line. The lenses may be replaced or combined with engineered reflective surfaces (e.g., concave or convex mirrors or mirror arrays) for the purpose of reshaping the beam(s), while adding a redirecting function that may be adapted to the dimensional constraints or natural layout of the elements.

Light beams between the laser array 102, the optical fiber array 104, and the photodiode array 106 are shown at 108 and 110.

With respect to the collimated laser array 102 and optical fiber array 104, laser beams of the laser array 102 may include parallel laser beams that are transmitted to the optical fiber array 104. According to examples disclosed herein, the photodiodes of the photodiode array 106 may include avalanche photodiodes for a relatively higher sensitivity.

With respect to the laser array 102, according to examples disclosed herein, instead of the laser array 102, the system 100 may include a relatively large laser (e.g., a single laser with a large transverse area). The laser array 102 may provide a higher coupling efficiency if perfectly matched to the optical fiber array 104, and may also provide the possibility of individually configuring each parallel OTDR (e.g., pulse repetition rate, pulse duration and synchronization thereof). According to examples disclosed herein, a broad area laser or a laser stack may include relatively large output power, which may compensate for a relatively lower coupling efficiency to each fiber core, while providing a further advantage of a coarse optical alignment. According to examples disclosed herein, a single broad area laser may impose pulse features that are common to all OTDRs. In this regard, the distance range may be set to match the longest link under test and the pulse duration may be set to match the highest budget loss. This configuration may provide for adaptation to the test of multiple and identical optical fibers from a single cable. In the context of a permanent monitoring system, the optical fiber links under test may be too different to be accurately characterized with a single set of acquisition parameters. In this case, the optical fiber links under test may be sorted into several categories, with several corresponding sets of acquisition parameters, and these categories of fibers may be sequentially acquired. The laser array 102 may include any type of laser, such as a semiconductor laser which may be a Fabry-Perot laser, a distributed feedback (DFB) laser, or a distributed Bragg reflector laser (DBR) (e.g., including external volume Bragg grating).

With respect to the optical fiber array 104, according to examples disclosed herein, instead of the optical fiber array 104, the system 100 may include a fiber bundle. In the case of the fiber bundle, a relatively large laser beam may be directed to the fiber bundle as disclosed herein.

With respect to the photodiode array 106, according to examples disclosed herein, instead of the photodiode array 106, the system 100 may include an image sensor. The image sensor may either utilize discreetly addressed elements, or one-dimensional or two-dimensional complementary metal-oxide-semiconductor (CMOS) technology. Compared to the photodiode array 106 where one photodiode may be precisely aligned with one fiber, the high pixel density of the image sensor may provide for a coarse alignment of the receiver, with the attribution of pixels, or packet of pixels, with each fiber being addressed by software. In this regard, the coarse alignment may bring the fiber array image to the image sensor. Each fiber beam may cover several pixels, where the fiber to pixels correspondence may be determined in production (e.g., by sending light backward into each fiber port), and a table may be retained in memory. The data of each pixel may be summed. The boundary pixels may be ignored or used to detect high power signals without saturation. The image sensor may also provide for serialization of pixel data into a single data stream that may be digitally output.

According to examples disclosed herein, the photodiode array 106 may include an InGaAs detector array. The one-dimensional or two-dimensional camera technology for the photodiode array 106 may provide for windowing (e.g., selection of a pixel in an area) or binning (e.g., reduction of pixel numbers, by combining neighboring pixels). Compared to the photodiode array 106, for an image sensor, by removing the one to one alignment of pixels with fibers, the image sensor may provide for usability with a higher fiber count. The progress of one-dimensional and two-dimensional camera technologies may facilitate achieving of a higher number of frames per second, which may result in obtaining information more rapidly and accurately. The windowing may focus on a single or a limited number of optical fibers. The binning may operate on the principle that a laser beam for each optical fiber covers more than a size of a binning area. In this regard, information from pixels may be combined. Moreover, speed of acquisition may be increased if performed by the camera (e.g., compared to maintaining full frame). Yet further, the one-dimensional and two-dimensional camera technologies may provide for selection of some pixels with lower illumination. Such pixels may be treated specifically to acquire signals with a highest intensity (e.g., in reflectometry, saturation may occur at Fresnel reflections).

A coupler 112, such as a 50/50 coupler, may be included in the path between the laser array 102 and the optical fiber array 104. In this regard, the backscattered signals from the optical fiber array 104 may be diverted by the coupler 112 to the photodiode array 106.

With respect to the photodiode array 106, there may be crosstalk between neighboring pixels. Crosstalk may be calibrated in production, and results may be post corrected (e.g., the influence of a strong Fresnel of one optical fiber onto a neighboring optical fibers trace may be corrected).

With respect to the arrangement of FIG. 1, the system 100 may include a single set of optical alignments. Further, instead of utilizing an optical switch, the system 100 may include a parallel architecture from laser emission at the laser array 102 to data sampling at the photodiode array 106.

The system 100 architecture of FIG. 1 may provide for parallel acquisitions on multiple lines. For example, each optical fiber of the optical fiber array 104 may be subject to parallel acquisition.

The system 100 architecture of FIG. 1 may also provide for relatively faster acquisition on a single port.

For the system 100, plates, such as the coupler 112, may be inserted as needed at emission or reception to treat all laser beams emitted from the laser array 102.

For the example of FIG. 1, according to an example, the laser array 102 may include 40 lasers separated by 250 μm, the optical fiber array 104 may include 40 optical fibers separated by 40 μm, and the photodiode array 106 may include 40 photodiode separated by 250 μm. Each laser beam of the laser array 102 may address a corresponding optical fiber of the optical fiber array 104, and backscattering may be measured by a corresponding photodiode of the photodiode array 106.

According to an example, the photodiode array 106 may include a CMOS photodiode array. For example, with respect to backscattered light, the correct pixels may be attributed to the correct fiber port for the photodiode array. In this regard, when an image sensor is utilized as disclosed herein, coarse alignment may be implemented with respect to the backscattering from the optical fiber array 104. With respect to the coarse alignment, a relatively large laser beam may be directed to a fiber bundle, with backscattered light being directed to the image sensor.

The system 100 may be utilized in continuous wave as a multisource, multi-power meter, and may be paired (e.g., one instrument at each side of a multi-fiber link) to conduct, for example, insertion loss, distance (e.g., modulation added), and reflectance measurements.

In multimode fiber applications, the two-dimensional camera with respect to the photodiode array 106 used as a receiver may provide for the characterization of the modal repartition of light present in each fiber (e.g., encircled flux measurement, or determination of the excited modes in the few mode fibers).

Yet further, for the system 100, multicore fibers, arrays and bundles of multicore fibers may be utilized as opposed to a single core fiber.

Figure 3:
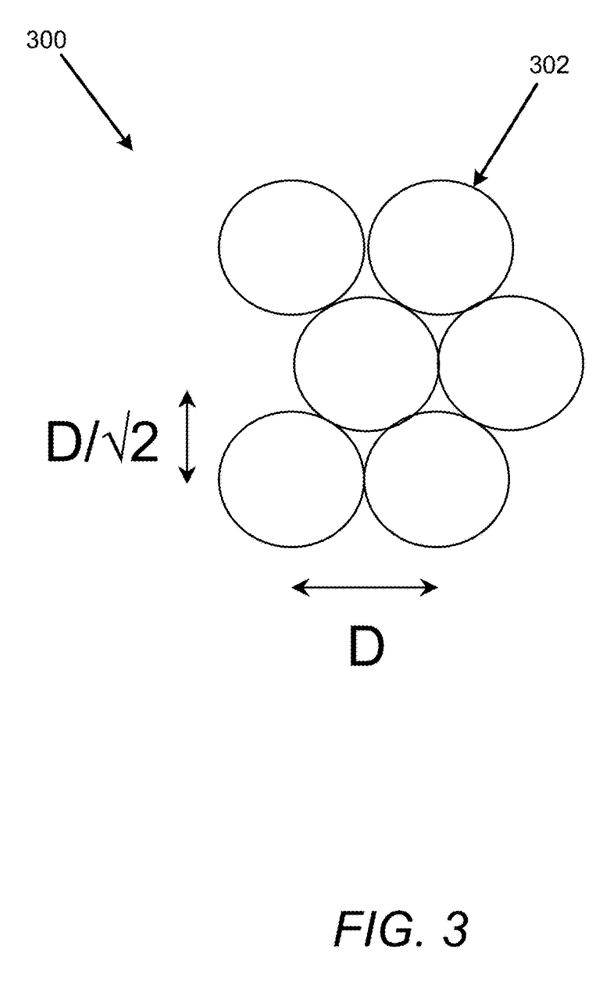
FIG. 3 illustrates a fiber bundle to illustrate operation of the parallel optics based optical time domain reflectometer acquisition system of FIG. 1 in accordance with an example of the present disclosure.

FIG. 3 illustrates a fiber bundle to illustrate operation of the system 100 in accordance with an example of the present disclosure.

Referring to FIGS. 1 and 3, as disclosed herein, with respect to the optical fiber array 104, instead of the optical fiber array 104, the system 100 may include a fiber bundle 300. In this regard, according to examples disclosed herein, optical fibers 302 of the fiber bundle 300 may be chemically etched so as to reduce their diameter. For example, a diameter of an optical fiber may be specified at 40 μm, where D represents a distance between optical fibers. In this regard, according to an example, a rectangular fiber bundle of 240×170 μm may include 36 optical fibers. For this example, since a ratio of a total area to core areas may be determined to be 13, a direct illumination of the entire fiber bundle 300 may provide an acceptable coupling ratio.

Figure 4:
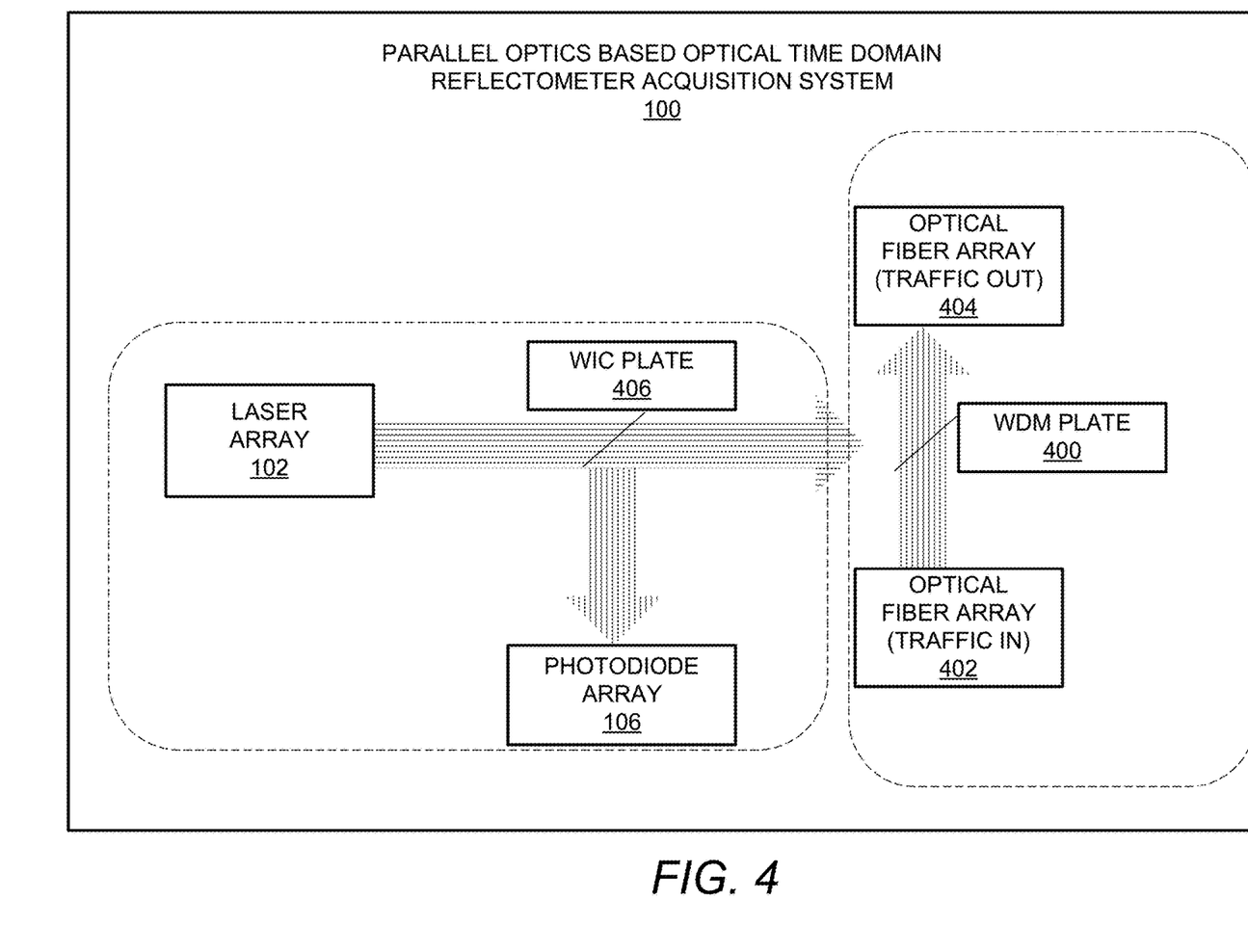
FIG. 4 illustrates inclusion of a wavelength-division multiplexing (WDM) plate for the parallel optics based optical time domain reflectometer acquisition system of FIG. 1 in accordance with an example of the present disclosure.

FIG. 4 illustrates inclusion of a wavelength-division multiplexing (WDM) plate for the system 100 in accordance with an example of the present disclosure.

Referring to FIGS. 1 and 4, for the example of FIG. 4, the system 100 may include a WDM plate 400. For example, a test signal from the laser array 102 may be added to a traffic signal that is transmitted from an optical fiber array traffic in position at 402 towards an optical fiber array traffic out position at 404 to provide live monitoring of traffic (e.g., telecom traffic) on the optical fiber array. A wavelength independent coupler (WIC) plate 406 (e.g., the coupler 112), which may be a 50/50 coupler, may be positioned as shown between the laser array 102 and the optical fiber array. An OTDR test signal at a certain wavelength (e.g., 1650 nm) may proceed from the optical fiber array traffic in position at 402 towards the optical fiber array traffic out position at 404. The WDM plate 400 may transmit traffic wavelengths, such as at 1550 nm, and may otherwise reflect wavelengths transmitted by the laser array 102. A backscatter signal may be reflected from the WDM plate 400 towards the WIC plate 406, and further towards the photodiode array 106 to provide live monitoring on the optical fiber array.

Figure 5:
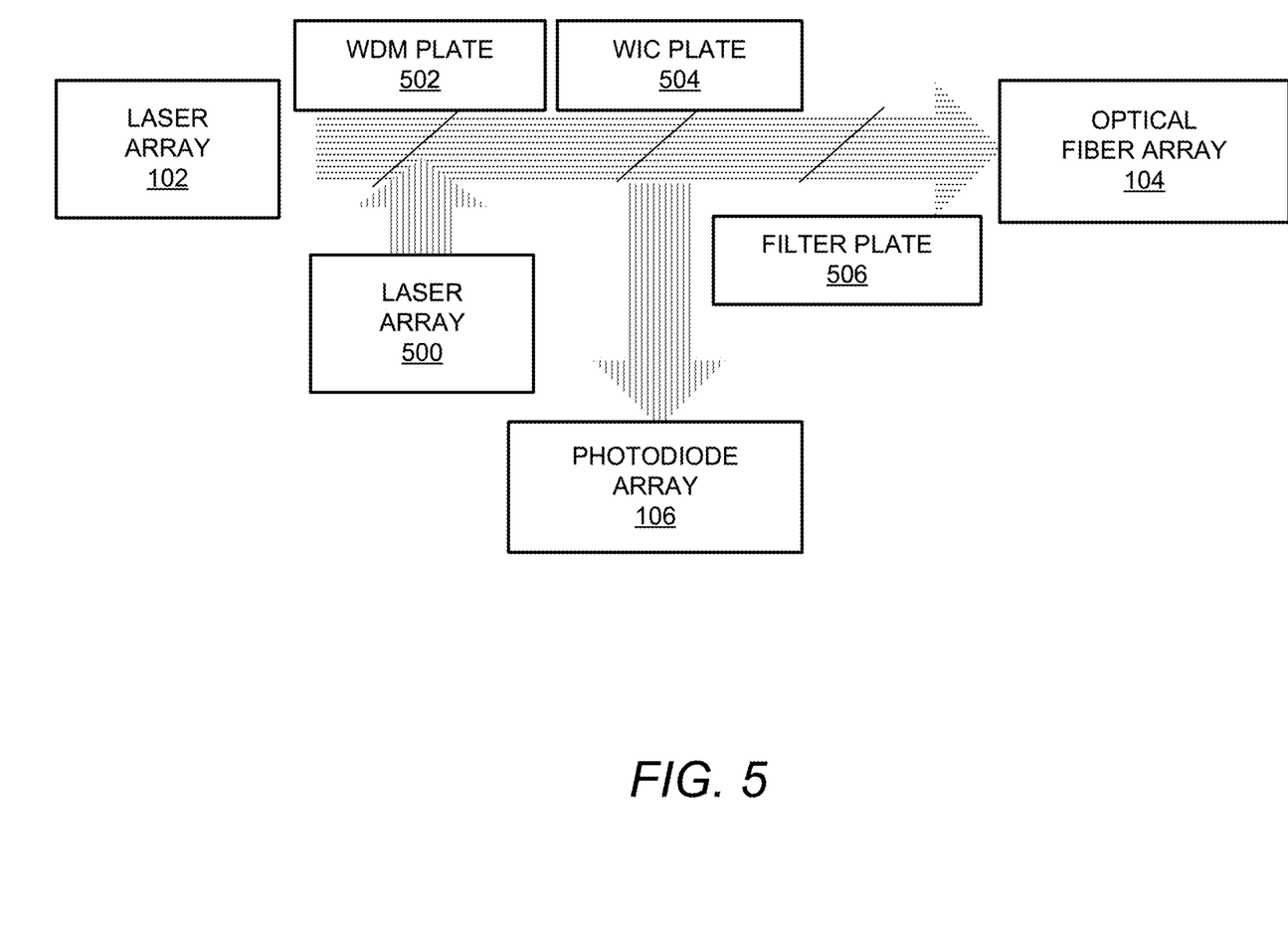
FIG. 5 illustrates inclusion of a plurality of lasers and filters for the parallel optics based optical time domain reflectometer acquisition system of FIG. 1 in accordance with an example of the present disclosure.

FIG. 5 illustrates inclusion of a plurality of lasers and filters for the system 100 in accordance with an example of the present disclosure.

Referring to FIGS. 1 and 5, compared to the example of FIG. 1 that includes the laser array 102, the optical fiber array 104, and the photodiode array 106, the example of FIG. 5 may include an additional laser array 500, a WDM plate 502, a WIC plate 504 (e.g., the coupler 112), and a filter plate 506. Using two or more laser wavelengths may provide a more complete characterization of the fiber under test. The filter plate 506, which may be added in any of the configurations previously described may protect the photodiode array 106 (e.g., the receiver) from traffic light that may be present in the fiber under test and/or serve to remove spurious test laser signals at traffic wavelengths which may perturb the network.

Figure 6:
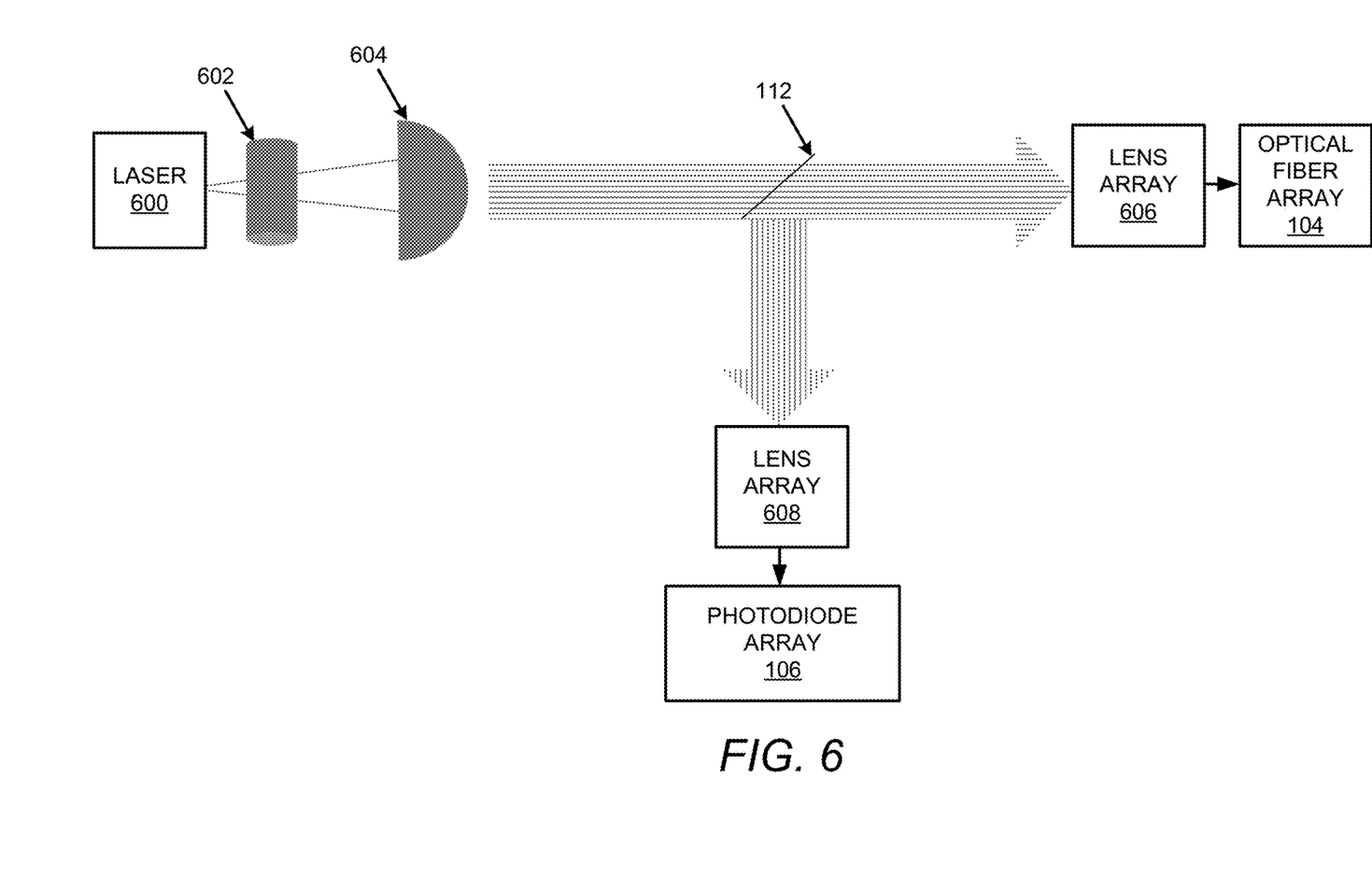
FIG. 6 illustrates a one-dimensional line sensor, one-dimensional optical fiber array, and one-dimensional laser arrangement for the parallel optics based optical time domain reflectometer acquisition system of FIG. 1 in accordance with an example of the present disclosure.

FIG. 6 illustrates a one-dimensional line sensor, a one-dimensional optical fiber array, and a one-dimensional laser arrangement for the system 100 in accordance with an example of the present disclosure.

Referring to FIGS. 1 and 6, compared to the example of FIG. 1 that includes the laser array 102, the example of FIG. 6 may include a laser 600. The laser 600 may include a single laser beam. A rod lens 602 and a cylindrical lens 604 may be utilized to collimate and control the expansion of the laser beam from the laser 600 on fast and slow axis respectively. In this regard, semiconductor lasers may include two transverse dimensions and two divergences with respect to these two dimensions (e.g., fast and slow, or parallel and perpendicular directions). For example, the rod lens 602 and the cylindrical lens 604 may collimate and control the laser beam from the laser 600 for transmission as a plurality of parallel laser beams to optical fibers of the optical fiber array 104. In this regard, the rod lens 602 and the cylindrical lens 604 may collimate and control expansion of the laser beam on fast and slow axis respectively for transmission of the laser beam as a plurality of parallel laser beams to optical fibers of the optical fiber array 104. For example, the laser 600 may provide a 200×10 μm emitting area.

With respect to the fast axis, the fast axis (e.g., in the narrow dimension of the laser line) may be highly diverging, and may therefore need to be processed as close as possible to the laser chip (e.g., since the fast axis is diverging relatively fast, the fast axis may need to be treated/collimated relatively fast), with a short focal length rod lens. The distant positioning of the cylindrical lens 604, with a corresponding focal length, may provide expansion of the laser beam(s), for example, to a 10 mm line at a 7 cm distance.

A diverging lens (not shown) may be inserted between the rod lens 602 and the cylindrical lens 604 to expand the slow axis in a more compact layout.

A lens array 606 may be provided before the optical fiber array 104. Similarly, a lens array 608 may be provided before the photodiode array 106. According to an example, the photodiode array 106 may include 40 pin photodiodes that include a 250 μm pitch, and 80 μm chips.

With respect to the laser 600, the optical fiber array 104, and the photodiode array 106 of FIG. 6 (and similarly FIG. 1), these components may be one-dimensional or two-dimensional. For example, for a two-dimensional configuration, the photodiode array 106 may include a Silicon, an InGaAs, or another such array.

Figure 7:
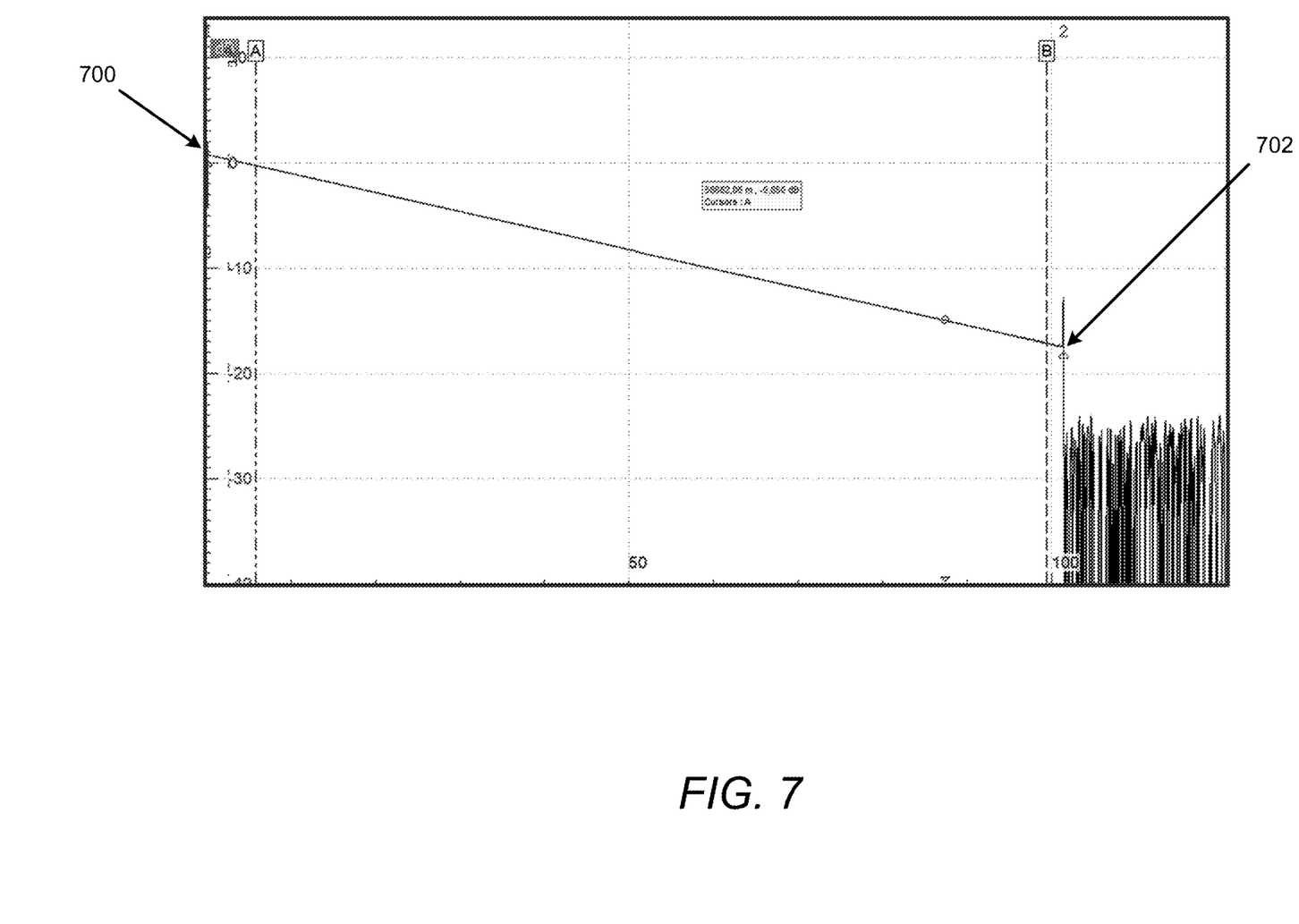
FIG. 7 illustrates a graph to illustrate performance of a two-dimensional optical fiber array for the parallel optics based optical time domain reflectometer acquisition system of FIG. 1 in accordance with an example of the present disclosure.

FIG. 7 illustrates a graph to illustrate performance of a two-dimensional fiber array for the system 100 in accordance with an example of the present disclosure.

Referring to FIGS. 1 and 7, with respect to a two-dimensional optical fiber array as disclosed herein with respect to the configuration of FIG. 6, according to an example, the two-dimensional optical fiber array may include a 12×12 (144 fibers) optical array. In order to analyze each of the optical fibers in such a two-dimensional optical fiber array, as shown in FIG. 7, sampling and monitoring may be limited to two points per optical fiber (e.g., at 700 and 702). According to examples disclosed herein, this technique may be adapted to the permanent monitoring of a large number of optical fibers, where variations of the total budget loss of each fiber may provide sufficiently reliable tracking information. In this regard, once a problem is detected on one fiber, a further high-resolution acquisition may be conducted (e.g., by utilization of the windowing feature as disclosed herein) to more completely analyze the fault, and to locate the fault.

Figure 8:
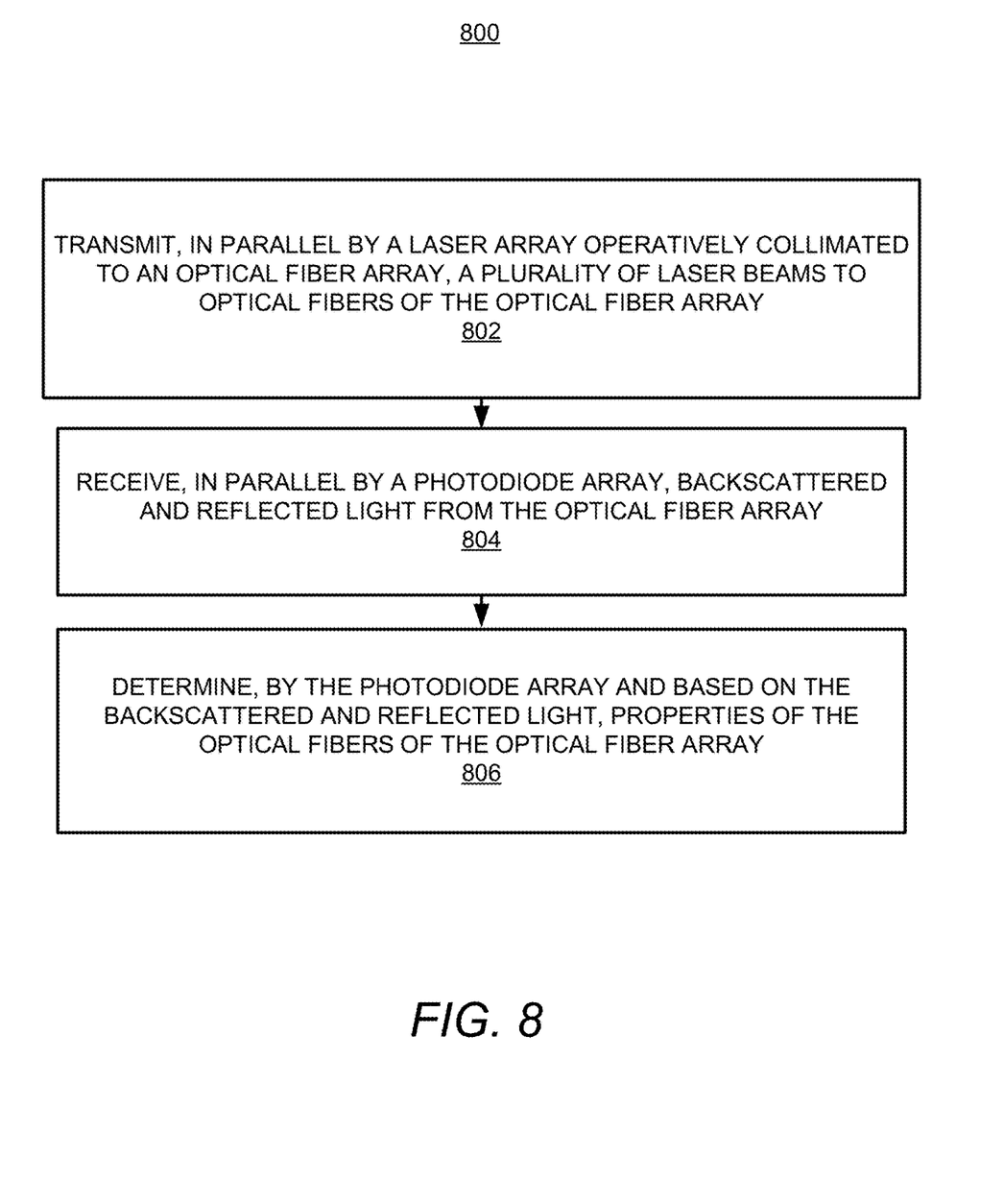
FIG. 8 illustrates a flowchart of an example method for parallel optics based optical time domain reflectometer acquisition in accordance with an example of the present disclosure.

FIG. 8 illustrate a flowchart of a method 800 for parallel optics based optical time domain reflectometer acquisition, according to examples. The method 800 may be implemented on the system 100 described above with reference to FIGS. 1-7 by way of example and not limitation. The method 800 may be practiced in other systems.

Referring to FIG. 1-8, and particularly FIG. 8, at block 802, the method 800 may include transmitting, in parallel by a laser array operatively collimated to an optical fiber array, a plurality of laser beams to optical fibers of the optical fiber array (e.g., see FIG. 1).

At block 804, the method 800 may include receiving, in parallel by a photodiode array, backscattered and reflected light from the optical fiber array.

At block 806, the method 800 may include determining, by the photodiode array and based on the backscattered and reflected light, properties of the optical fibers of the optical fiber array.

Figure 9:
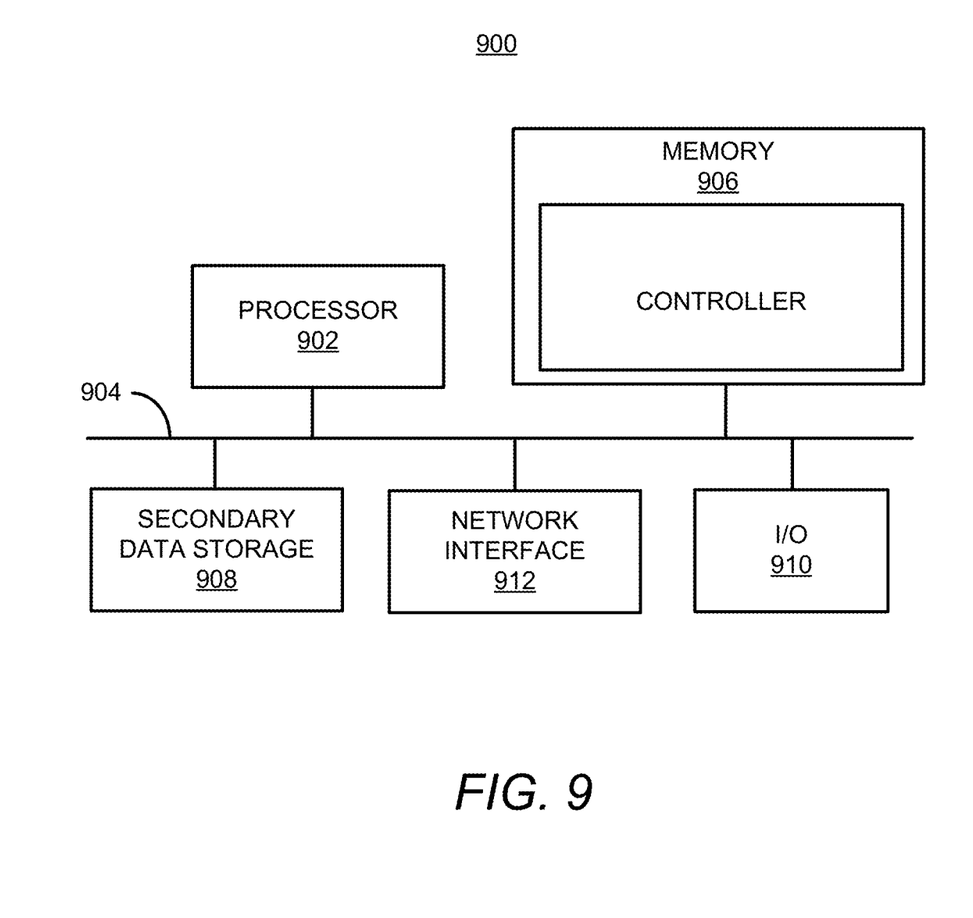
FIG. 9 illustrates a computer system, according to an example of the present disclosure.

FIG. 9 shows a computer system 900 that may be used with the examples described herein. The computer system may represent a platform that includes components that may be in a server or another computer system. The computer system 900 may be used as part of a platform for controllers of the system 100 (generally designated controller in FIG. 9). The computer system 900 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 900 may include a processor 902 that may implement or execute machine readable instructions performing some or all of the methods, functions and other processes described herein. Commands and data from the processor 902 may be communicated over a communication bus 904. The computer system may also include a main memory 906, such as a random access memory (RAM), where the machine readable instructions and data for the processor 902 may reside during runtime, and a secondary data storage 908, which may be non-volatile and stores machine readable instructions and data. The memory and data storage are examples of computer readable mediums. The main memory 906 may include the controller (e.g., for the system 100) including machine readable instructions residing in the main memory 906 during runtime and executed by the processor 902.

The computer system 900 may include an input/output (I/O) device 910, such as a keyboard, a mouse, a display, etc. The computer system may include a network interface 912 for connecting to a network. Other known electronic components may be added or substituted in the computer system.

The processor 902 may be designated as a hardware processor. The processor 902 may execute operations associated with various components of the system 100. For example, the processor 902 may execute operations associated with the controller (e.g., for the system 100), etc.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A parallel optics based optical time domain reflectometer (OTDR) acquisition system comprising:
    a laser array operatively collimated to an optical fiber array to transmit, in parallel, a plurality of laser beams to optical fibers of the optical fiber array;
    a photodiode array to
        receive, in parallel, backscattered and reflected light from the optical fiber array; and a processor to determine, based on the backscattered and reflected light, properties of the optical fibers of the optical fiber array.

2. The parallel optics based optical time domain reflectometer acquisition system according to claim 1, further comprising:
a coupler operatively disposed in a transmission path between the laser array and the optical fiber array to
transmit the plurality of laser beams to the optical fibers of the optical fiber array, and
reflect the backscattered and reflected light from the optical fibers to the photodiode array.

3. The parallel optics based optical time domain reflectometer acquisition system according to claim 1, wherein the laser array, the optical fiber array, and the photodiode array include a one-dimensional configuration.

4. The parallel optics based optical time domain reflectometer acquisition system according to claim 1, wherein the laser array, the optical fiber array, and the photodiode array include a two-dimensional configuration.

5. The parallel optics based optical time domain reflectometer acquisition system according to claim 1, wherein the optical fiber array includes an optical fiber array traffic in position and an optical fiber array traffic out position, further comprising:
a wavelength-division multiplexing plate operatively disposed between the optical fiber array traffic in position and the optical fiber array traffic out position to
transmit a wavelength at a specified frequency from the optical fiber array traffic in position and the optical fiber array traffic out position, and
reflect another wavelength at another specified frequency from the optical fiber array traffic out position towards the photodiode array.

6. A parallel optics based optical time domain reflectometer (OTDR) acquisition system comprising:
a laser to transmit a laser beam;
a rod lens and a cylindrical lens to collimate and control the laser beam from the laser for transmission as a plurality of parallel laser beams to optical fibers of an optical fiber array;
a photodiode array to
receive, in parallel, backscattered and reflected light from the optical fiber array; and
a processor to determine, based on the backscattered and reflected light, properties of the optical fibers of the optical fiber array.

7. The parallel optics based optical time domain reflectometer acquisition system according to claim 6, further comprising:
a coupler operatively disposed in a transmission path between the laser and the optical fiber array to
transmit the plurality of parallel laser beams to the optical fibers of the optical fiber array, and
reflect the backscattered and reflected light from the optical fibers to the photodiode array.

8. The parallel optics based optical time domain reflectometer acquisition system according to claim 6, wherein the laser, the optical fiber array, and the photodiode array include a one-dimensional configuration.

9. The parallel optics based optical time domain reflectometer acquisition system according to claim 6, wherein the laser, the optical fiber array, and the photodiode array include a two-dimensional configuration.

10. The parallel optics based optical time domain reflectometer acquisition system according to claim 6, a lens array operatively disposed between the laser and the optical fiber array.

11. The parallel optics based optical time domain reflectometer acquisition system according to claim 6, a lens array operatively disposed between the optical fiber array and the photodiode array.

12. A parallel optics based optical time domain reflectometer (OTDR) acquisition system comprising:
a laser to transmit a laser beam toward an optical fiber array;
a rod lens and a cylindrical lens to collimate and control expansion of the laser beam on fast and slow axis respectively for transmission of the laser beam as a plurality of parallel laser beams to optical fibers of the optical fiber array;
a photodiode array to
receive, in parallel, backscattered and reflected light from the optical fiber array and
a processor to determine, based on the backscattered and reflected light, properties of the optical fibers of the optical fiber array.

13. The parallel optics based optical time domain reflectometer acquisition system according to claim 12, further comprising:
a coupler operatively disposed in a transmission path between the laser and the optical fiber array to
transmit the plurality of parallel laser beams to the optical fibers of the optical fiber array, and
reflect the backscattered and reflected light from the optical fibers to the photodiode array.

14. The parallel optics based optical time domain reflectometer acquisition system according to claim 12, wherein the laser, the optical fiber array, and the photodiode array include a one-dimensional configuration.

15. The parallel optics based optical time domain reflectometer acquisition system according to claim 12, wherein the laser, the optical fiber array, and the photodiode array include a two-dimensional configuration.

16. The parallel optics based optical time domain reflectometer acquisition system according to claim 12, a lens array operatively disposed between the laser and the optical fiber array.

17. The parallel optics based optical time domain reflectometer acquisition system according to claim 12, a lens array operatively disposed between the optical fiber array and the photodiode array.

* * * * *